Nov. 15, 1960 L. P. MARTUCH 2,960,062
VARIABLE STRAND COATING DEVICE
Filed Jan. 13, 1954 2 Sheets-Sheet 1
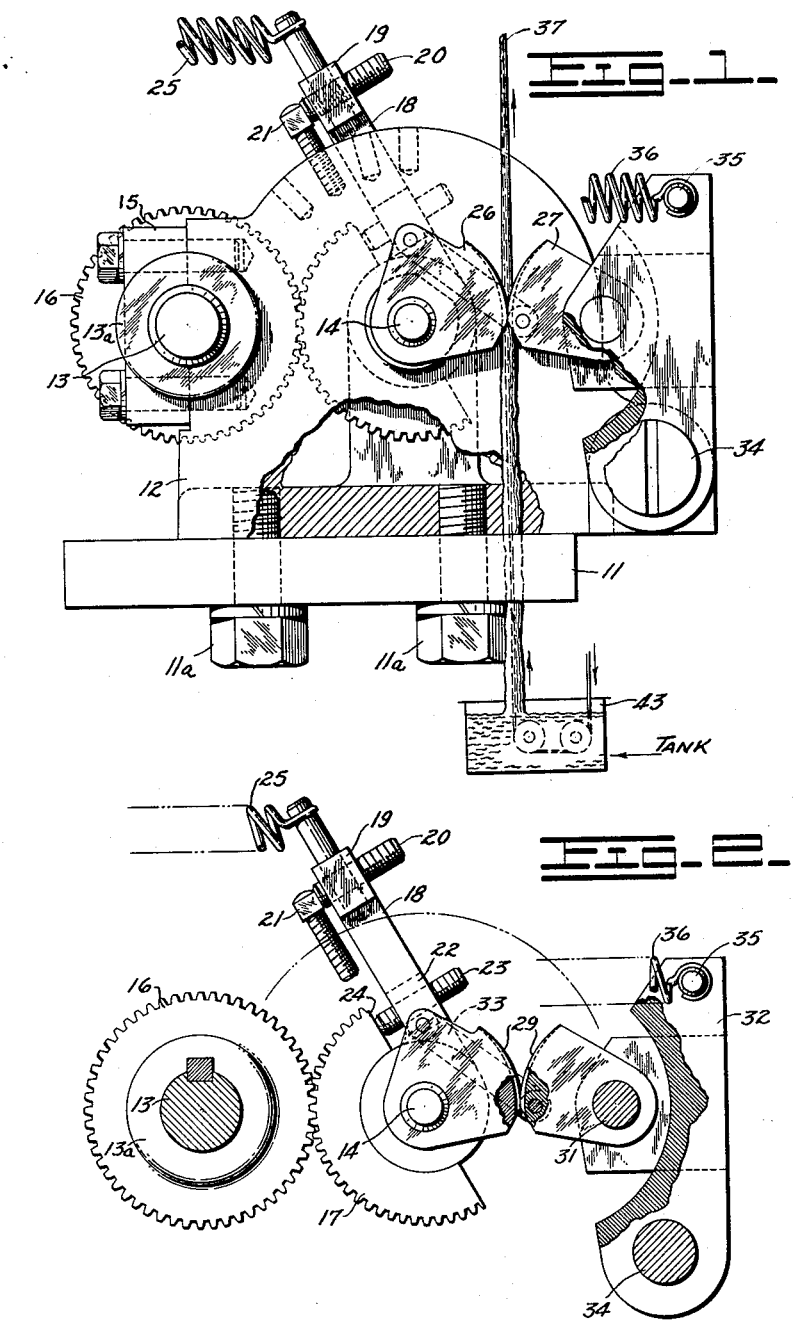
INVENTOR
LEON P. MARTUCH
BY
Laurence VanderKelen & Miller
ATTORNEYS Nov. 15, 1960 L. P. MARTUCH 2,960,062
VARIABLE STRAND COATING DEVICE
Filed Jan. 13, 1954 2 Sheets-Sheet 2
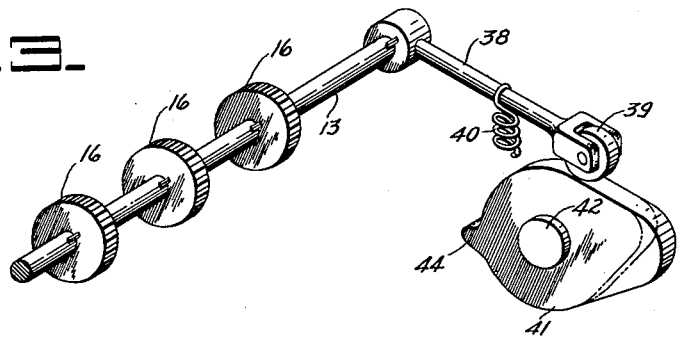
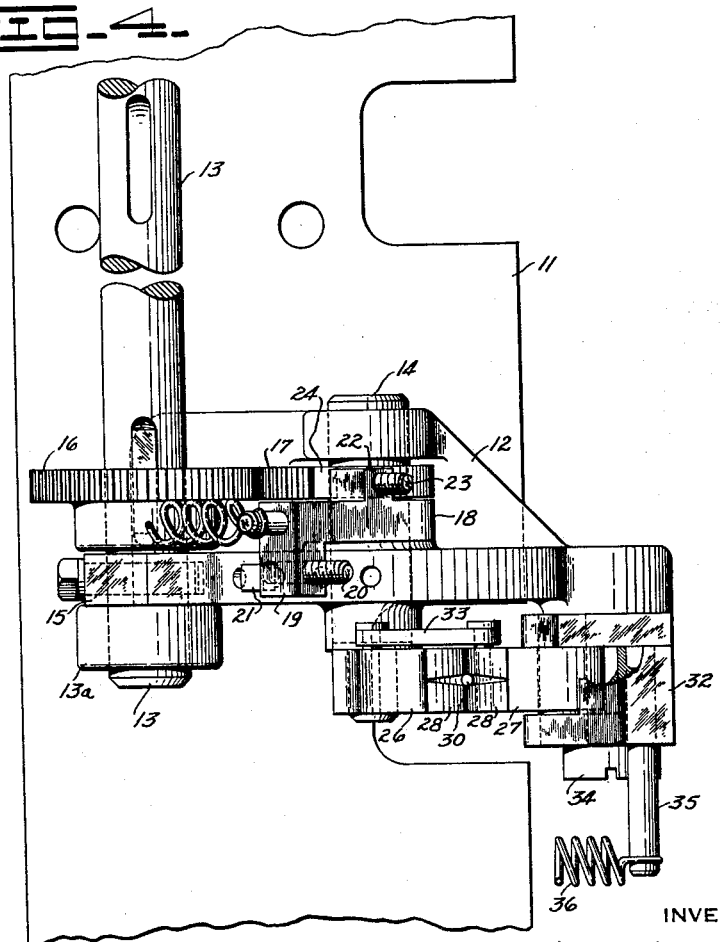
INVENTOR
LEON P. MARTUCH
BY
Laurence Vanderveen & Miller
ATTORNEYS United States Patent Office 2,960,062
Patented Nov. 15, 1960

2,960,062

VARIABLE STRAND COATING DEVICE

Leon P. Martuch, Midland, Mich., assignor to Scientific Anglers, Inc., Midland, Mich., a corporation of Michigan Filed Jan. 13, 1954, Ser. No. 403,823

5 Claims. (Cl. 118—102)

The present invention relates to a variable coating and apparatus for the manufacture thereof. More particularly the invention relates to a structure for the production of a variable thickness coating in controlled dimensions on a basic strand or line. The basic line is dimensionally altered by the laying on of a variable thickness of coating material in order to achieve desired dimensions. The diameter or thickness of such coating is automatically established and the finished sized line or strand is continuously and accurately produced.

In the preparation of fly lines, for example, the sizing and coating of the fly lines to achieve proper distribution of weight in the line so as to permit long and accurate casts has presented a problem long under attack. The fly lines prepared require that the diameter be varied along the length of the line to appropriately position the most weighty portion of the line near the tip thereof. The diameter of the fly line must be kept to a minimum and yet resiliency and strength must be incorporated therein. Further, the line must be waterproofed so that despite heavy service under relatively abrasive conditions, the surface coating or waterproofing will not be harmed. Starting with a basic level line of even diameter, it has been the practice in producing tapered fly lines to slice or inter-braid lines and vary the diameter by splicing to achieve this suitable weight distribution. Subsequently, coating is applied to the line so as to form a waterproof sheath. In the present invention it is possible to eliminate the necessity for braiding and splicing basic lines. Simultaneously with the application of waterproofing and sheathing material the line prepared in accordance with this invention is sized and rendered floatable. Variable line thickness is automatically and speedily accomplished. By reason of the nature of the coating material, proper resiliency and strength characteristics are incorporated in the finished fly line.

Therefore, among the objects of this invention is to provide an apparatus capable of variably sizing the diameter of a fly line along the entire length thereof.

Another object is to provide an apparatus which will apply a uniform coating thickness of material to a single strand of line in a continuous and accurately repetitious manner so that along the entire length of line the basic strand is properly centered.

Another object is to eliminate braiding of tapered fly lines so that cost is minimized thereby. Another object is to permit simple coating material to be applied to a line which will satisfactorily render the line resilient, durable, and floatable. Other objects and purposes of this invention will become apparent as the description proceeds.

In the drawings:

Figure 1 is a side elevation of the apparatus for varying line diameter.

Figure 2 is a fragmental side elevational view showing the mating grooved cam faces, the positioning adjustment, and the gear train with the spring tensioning arrangement fragmentally illustrated.

Figure 3 is a perspective view of the main shaft showing the positioning of three drive gears for multiple units and an exaggerated master cam and follower.

Figure 4 is a plan view of a single unit of the variable line coating apparatus mounted on the assembly bar.

General description

In general the apparatus for variably coating line consists of a pair of mating cams having grooved faces which are linked in such a manner that the movement of one of the cams causes corresponding movement in the other of said mating cams. The mated grooves, varying in depth, define, as the cams move, an orifice of varying diameter. The cams are actuated by a gear train which in turn is moved by a main shaft which rotationally reciprocates in conformance with a pattern established by a master cam. Response to the movement of the master cam is transmitted to the main shaft by means of a lever keyed to the main shaft and having a cam follower mounted on its extending end which tensionally rides the master cam face. The drive gear, being keyed to the main shaft, is driven by the rotation of the main shaft and the driven half gear is correspondingly and oppositely driven by the driving gear. The driven half gear is not keyed to the stub shaft upon which it rotates, but its rotation is translated into motion in the mating cams by reason of its movement being transmitted to the tensionally held adjusting arm. The adjusting arm is driveably engaged with the stub shaft. The inner mating cam is also driveably upon the stub shaft. A dog with adjusting screw extends to tensionally engage the back of the driven half gear so that rotation of the half gear causes a rotational response in the adjusting arm and consequently moves the mating cam upon the stub shaft. By reason of the connecting link both the mating cams are moved a corresponding amount, the outer mating cam moving upon its pivot pin and the inner mating cam driven upon the stub shaft. By a mere extension of the main shaft a plurality of line forming units may operate simultaneously from the same master cam to produce identical lines or different lines depending upon the maximum and minimum diameters set upon the adjusting arms.

The movement of the master cam is coordinated with the line moving mechanism. For purposes of illustration a convenient operating speed for moving line through the orifice is six feet per minute. Since the standard length of line is thirty yards or ninety feet the full revolution of the master cam would be set at fifteen minutes. The line moving mechanism not being a part of this invention is not illustrated, but to place the structure in its operative setting must be mentioned at least functionally. Level line having a maximum diameter smaller than the minimum orifice diameter is drawn through a coating bath and up through the orifice formed by the mating cams. The orifice wipes off the excess coating material and sizes the line in accordance with the diameter pattern established by the master cam or pattern member. The line moves normally at constant speed through the orifice and thence into drying and curing chambers. The line may or may not then be returned for subsequent coating treatment.

Specific description

Referring more particularly to the drawing an assembly bar 11 is provided to which the apparatus may be securely bolted as by bolts 11a. The assembly bar 11 is positioned over a coating bath tank. A single unit of the apparatus consists of a base casting 12 which accommodates therethrough the parallel mounting of a main shaft 13 and a stub shaft 14. The main shaft 13 is journaled in the base casting and retained by a bearing cap 15 which facilitates removal, but it will be understood that other journaling arrangements could be employed without a departure from the spirit of the invention. By extending the main shaft 13, as shown in Fig. 3, it is understood that multiple units can be operated from the common shaft. A set collar 13a is positioned over the end of the main shaft 13 to assure that lateral shifting of the main shaft 13 does not occur. To the main shaft 13 is driveably attached a full gear 16. Upon the stub shaft 14 is positioned a driven half gear 17. The half gear 17 is not driveably connected to the stub shaft 14 for reasons which will hereinafter be explained. The half gear 17 is meshed with the driving gear 16 and rotates upon the stub shaft 14 as it is moved by the driving gear 16. An adjusting arm 18 is driveably connected to the stub shaft 14. The adjusting arm 18 extends above the base casting 12 and is provided with a lug 19 through which adjustably and threadably protrudes a set screw 20. The set screw 20 adjustably engages a stop 21 which may be variously positioned in the base casting 12 in convenient angular increments radially from the center of the stub shaft 14. A dog 22 also extends from the adjusting arm 18 and is threaded to accommodate an adjusting screw 23. The dog 22 thus is adjustably arranged to engage the back portion 24 of the driven half gear 17. The adjusting arm 18 is tensionally drawn in the direction of the driving gear 16 by a spring 25 or other tensioning means.

A pair of mating cams 26 and 27 are positioned on the opposite side of the base casting 12. The cam faces 28 are provided with a varying depth groove 29 which matingly define an orifice 30 of changing diameter as the mating cams 26 and 27 are correspondingly rotated. The mating cam 26 is driveably attached to the stub shaft 14. The mating cam 27 is freely rotatable upon a pin 31 extending transversely through a cam retainer 32. A connecting link 33 is pivotally and diagonally attached to both mating cams 26 and 27 so that the movement of cam 26 causes corresponding movement in cam 27. The cam retainer 32 partially shrouds the cam 27 and is closely fitted to the cam 27 and carries the pin 31 about which the cam 27 may rotate. The cam retainer 32 is pivotal upon the bolt 34 which extends transversely through the base casting 12. A connector bar 35 extends outwardly from the cam retainer 32 and is tensionally drawn in the direction of the main shaft by the spring 36 or other resilient tensioning means. Thus the mating cam 27 is held in contact tensionally with its twin 26 but where obstructions such as knots move through the orifice 30 the resiliency in spring 36 permits the line 37 to move easily therethrough.

To the outboard end of the main shaft a lever 38 is keyed or otherwise driveably connected to the main shaft 13 and extends radially therefrom. At the end of the lever 38 remote from the shaft 13 a cam follower 39 is attached. The cam follower 39 is tensionally held as by spring 40 in contact with the cam face of a master cam 41. As the master cam 41 is rotated upon its shaft 42 the lever 38 is moved causing rotational response in the main shaft 13 and consequent movement of the drive gear 16, the driven gear 17, the adjusting arm 18 and the corresponding movement of the mating cams 26 and 27 which varies the orifice diameter 30.

The shape of the master cam 41, defining the movement of the mating cams 26 and 27 so as to vary the orifice 30, is formed to develop the movement required to produce the line diameter variations required and the taper transitions necessary in a smooth manner. It is understood that manual or other means can be employed for rotationally reciprocating the drive or main shaft 13. The form of the master cam 41 and the rotational speed thereof is determined by the speed of the line 37 moving through the orifice 30. The line moving mechanism, not shown because it is conventional and not a part of the present invention, draws the line 37 through a coating tank 43 (schematically shown) and continuously upward through the orifice 30.

Suppose a thirty yard line is desired to be repetitiously produced and the line speed is six feet per minute. Fifteen minutes will be required to draw ninety feet of line through the orifice 30 during which time the master cam 41 shall have made one full revolution. Thus the rotational speed of the master cam 41 can be simply determined. By establishing an irregularity 44 in the master cam 41 an abrupt transition in the orifice size 30 is caused and this provides a simple means for marking the terminal point for separating the continuously produced line into the thirty yard or other convenient lengths.

By adjusting the stop 21 and the adjusting screws 20 and 23 on the adjusting arm 18, variations in maximum and minimum diameter may be achieved repetitiously using the same master cam 41.

*Operation*

In operation, line 27 to be sized is fed continuously and at a constant rate through a bath of coating material and subsequently drawn through the orifice 30 defined by the grooved faces of the mating cams 26 and 27. Constantly the orifice size is varying in response to the movement of the master cam 41 imparted to the main shaft 13 by means of the lever 38. The line 27 is wiped peripherally by the orifice 30 thus sizing the line. Continuously the sized line is fed to drying and during stages not a part of this invention. Varying styles of tapers in the line 27 may be prepared in the line by varying the diameters of the orifice 30 by means of the particular movement given to the main shaft 13 or by varying the maximum and minimum diameters by the adjustments provided on the adjusting arm 18.

Although a single unit has been described herein it will be understood the apparatus is adaptable to multiple mounting by merely extending the main shaft so as to pass through a series of identically mounted structures journaling the common main shaft 13. It will be seen that such a battery of identical structures operating from a common shaft movement may be adapted to turn out identical lines or each may be adjusted to repetitionally produce lines different in maximum and minimum diameter characteristics from the adjacent unit by alterations in the adjustments of each structure. In Fig. 3 the assembly bar 11 is shown prepared for the mounting of additional identical units. The master cam 41, shown in Fig. 3 is intended to represent only one form of cam. While the lever 38 moved by the master cam 41 has proved satisfactory in practice it is to be understood that equivalent mechanical movement, as by means of a rack and pinion, is also encompassed by the scope of the invention. Further variations will be understood to be encompassed by the scope of this invention.

Having thus described one embodiment of my invention, I claim:

1. In an apparatus for variably coating line, the combination including: a pair of mating cams having correspondingly grooved faces of constantly varying depth defining a circular orifice of variable diameter; an adjusting arm reciprocating rotationally one of said cams; a connecting link diagonally and pivotally connecting said pair of mating cams; a driven half gear moving said adjusting arm in one direction; a spring urging the return of said adjusting arm as said driven gear is reversed; a variably positioned stop positioned to engage said adjusting arm; an adjustment on said adjusting arm engaging said driven gear; and means causing limited rotational reciprocation of said drive gear.

2. In an apparatus as described in claim 1, wherein the means consist of: a shaft driveably connected to said drive gear; a lever driveably connected to said shaft; and cam means cycling the movement of said lever.

3. In an apparatus for variably coating line, the combination including: a base casting having transverse openings therethrough; a drive shaft journaled in one of the openings through said base casting; a stub shaft extending rotatably through the other of the openings in said base casting; a full gear driveably connected to said drive shaft; a half gear rotatable on said stub shaft and in mesh with said full gear; an adjusting arm having an adjusting dog and screw extending to engage the back of said half gear and positioned driveably on said stub shaft adjacent said half gear; an adjusting arm tension spring resisting movement of said adjusting arm away from the direction of said drive shaft; a stop variably and radially extending from said base casting in angular increments from said stub shaft; a lug and adjusting screw extending from said adjusting arm adjustably engaging said stop; a lever driveably connected to said drive shaft and having a cam follower upon the unconnected end thereof; a master cam deflecting the said lever; a tensioning spring holding said lever so that the said cam follower thereupon traces the path of the master cam face; and a drive mechanism rotating said master cam.

4. In an apparatus for placing a tapered coating on line of substantially constant diameter, the combination including: A pair of mating cams in resilient contact having correspondingly grooved faces of constantly varying depth defining a circular orifice of variable diameter; means simultaneously rotating said cams for varying the diameter of said orifice; and means controlling the extent of rotation of said cams repetitiously in coordination with line moving through said orifice to produce repetitiously a tapered finished coated line.

5. In an apparatus as described in claim 4 wherein the means controlling the extent of rotation of said cams comprises: A pattern member rotating at a rate of movement coordinated with the movement of substantially level line.

References Cited in the file of this patent

UNITED STATES PATENTS

| | | |
|---|---|---|
| 930,115 | Alley | Aug. 3, 1909 |
| 1,387,606 | Meyer | Aug. 16, 1921 |
| 2,426,896 | Neville et al. | Sept. 2, 1947 |